United States Patent [19]

Cardone et al.

[11] Patent Number: 4,847,582

[45] Date of Patent: Jul. 11, 1989

[54] MAGNETIC GRIPPING APPARATUS

[75] Inventors: Michele Cardone; Angelo Grandini; Bruno Zaramella, all of Milan, Italy

[73] Assignee: Tecnomagnete S.p.A., Milan, Italy

[21] Appl. No.: 73,538

[22] Filed: Jul. 15, 1987

[30] Foreign Application Priority Data

Jul. 28, 1986 [IT] Italy .................. 21277 A/86

[51] Int. Cl.$^4$ .................................................. H01F 7/20
[52] U.S. Cl. ........................................ 335/289; 335/290; 335/294
[58] Field of Search ................ 335/289, 290, 291, 292, 335/293, 294

[56] References Cited

U.S. PATENT DOCUMENTS

| 675,235 | 6/1901 | Clark | 335/290 |
|---|---|---|---|
| 2,286,238 | 6/1942 | Simmons | 335/295 |
| 2,348,967 | 5/1944 | Duby | 335/290 |
| 2,771,571 | 11/1956 | Carson et al. | 335/285 |
| 3,316,514 | 4/1967 | Radus et al. | 335/291 |
| 3,340,442 | 9/1967 | Braillon | 335/290 X |
| 3,389,358 | 6/1968 | Tubbs | 335/291 X |
| 3,555,474 | 1/1971 | Marcher | 335/289 |
| 3,978,441 | 8/1976 | Sobottka et al. | 335/284 |
| 4,014,289 | 3/1977 | Zimmer | 335/295 X |
| 4,075,589 | 2/1978 | Braillon | 335/286 |
| 4,090,162 | 5/1978 | Cardone et al. | 335/289 |
| 4,141,547 | 2/1979 | Duquenne et al. | 277/80 |
| 4,251,791 | 2/1981 | Yanagisawa et al. | 335/302 |
| 4,507,635 | 3/1985 | Cardone et al. | 335/291 |

FOREIGN PATENT DOCUMENTS

| 3201826 | 1/1982 | Fed. Rep. of Germany . | |
|---|---|---|---|
| 1517059 | 2/1968 | France . | |
| 2241859 | 3/1975 | France . | |
| 60-144914 | 7/1985 | Japan | 335/286 |
| 563333 | 5/1944 | United Kingdom . | |
| 758183 | 10/1956 | United Kingdom . | |
| 1270176 | 4/1972 | United Kingdom . | |
| 2037083 | 7/1980 | United Kingdom . | |
| 2038560 | 7/1980 | United Kingdom . | |

OTHER PUBLICATIONS

"Permanent Magnets in Theory and Practice", pp. 240-246.

Primary Examiner—George Harris
Attorney, Agent, or Firm—Beveridge, DeGrandi & Weilacher

[57] ABSTRACT

A magnetic gripping apparatus for gripping metal parts on machine tools, conveyor systems and the like. The apparatus comprises an external ferromagnetic yoke having a base plate and lateral walls; a first and at least a second pole unit, each unit comprising a main pole piece having an outer face defining a work-gripping surface parallel to said base plate; and an intermediate pole member between said first and second pole units, said pole member extending from the base plate to the gripping surface, and permanent magnets arranged at least between the main pole pieces, the base plate and an electric winding encircling the magnets between the main pole pieces and the base plate, said permanent magnets, in an activated condition of the apparatus, providing a pole distribution on the gripping surface in which said first and second pole units exhibit poles of opposite polarity on their outer faces.

9 Claims, 3 Drawing Sheets

MAGNETIC GRIPPING APPARATUS

BACKGROUND OF THE INVENTION

This invention refers to a permanent-magnet apparatus for anchoring or gripping metal pieces on machine tools, conveying and transporting systems, which makes use of a magnetic circuit capable of automatically adapting its characteristics in relation to the dimensions of the metal pieces to be anchored; for the purposes of this description, the term "permanent magnet anchoring apparatus" is understood as any device which makes use of permanently magnetized or magnetizable magnet core members, which can be activated and deactivated either by reversing the magnetization of some of the magnets of at least two pole units, or by magnetizing and demagnetizing the magnets themselves. The magnetic anchoring apparatus currently in use are mainly designed to be used for gripping workpieces of very variable dimensions, however it is highly unlikely for any apparatus to be able to maintain the same operating efficiency with all sizes and types of workpieces. There are in practice, two main categories of magnetic anchoring apparatus: the first category is designed to be very effectively used on workpieces of average or large dimensions, for which it is essential to have a considerable magnetic field depth in the workpiece to be anchored in order to utilize as much as possible the magnetomotive force necessary to grip the workpieces securely. The second category refers to the magnetic apparatus designed for use on small-sized workpieces, for which, more than the field depth or the magnetomotive force generated by the magnetic circuit, it is important to have a dense polarity on the anchoring or gripping surface, by bringing the individual pole as close as possible, so that each piece, however small it may be, can short-circuit at least two poles of opposite polarity.

In the case of the apparatus belonging to the first category, with which it is possible to magnetically grip workpieces to be subjected to heavy machining, such as milling for example, the need to have high magnetomotive tension and, therefore, high anchoring power involves keeping the poles sufficiently far apart from one another, as to reduce the losses of flux in the gap between adjacent pole units to a minimum; consequently, as a result of the high pole pitch that these devices must have, they prove to be totally unreliable in gripping relatively small workpieces. Conversely, in the case of the apparatus of the second category, the dense polarity, that is to say, a short distance between adjacent pole units, is obtained by using special pole plates for distributing the magnetic flux, which are characterized by structural complexity, high costs and very poor operating efficiency; they consequently prove to be wholly unreliable in gripping large-sized workpieces. In conclusion, each apparatus for both categories must necessarily be used in the field of work for which it was designed, with the need therefore to make use of different apparatus for differently sized workpieces to be magnetically gripped.

The scope of this invention is to provide a magnetic gripping apparatus, for example of the type described in U.S Pat. No. 4,356,467, U.S. Pat. No. 4,356,167, U.S. Pat. No. 4,507,635 and GB-A No. 758183, which is capable of automatically modifying the characteristics of its magnetic circuit, or the magnetomotive force, and the pitches or distances between poles, to adapt them automatically to the dimensions of the workpieces to be anchored, without impairing the high degree of efficiency of the apparatus and without changing any part of the latter.

A further scope of this invention is to provide an apparatus of the aforementioned type, which is capable of achieving all this by means of a comparatively inexpensive and mechanically sturdy magnetic structure.

A still further scope of this invention is to provide a magnetic gripping apparatus, as specified above, which, in addition to being capable of automatically modifying its pole pitch, since the actual dimensions of the workpieces to be gripped contribute to modifying the magnetic circuit of the apparatus which is thus able to provide two different pole pitches without altering the distances between the various pole units, can also be adapted for use as a permanent magnet device, both of the reversible flux type, as described for example in the three previously mentioned U.S. patents, and of the total demagnetization type, as described in GB-A No. 758183.

SUMMARY OF THE INVENTION

According to the invention, a magnetic gripping apparatus has been provided, comprising an external ferromagnetic yoke having a base plate and peripheral walls; at least a first and a second pole unit, each pole unit comprising a main pole piece having an outer face defining a gripping surface, and an intermediate pole member between said first and second pole units, said pole member extending from the base plate to said gripping surface; permanent magnets arranged at least between the main pole pieces and the base plate and an electrical winding encircling the magnets between the main pole pieces and the base plate, said permanent magnets, in the activated condition of the apparatus, providing a pole distribution of the gripping surface in which said first and second pole units or respectively one of said pole unit and said intermediate pole member exhibit poles of opposite polarity on their outer faces.

The originality and innovative feature of the apparatus according to this invention consists in the fact that the intermediate pole member, which is not usually fed by any magnetic source and merely constitutes a short-circuiting member between adjacent pole units when gripping large-sized workpieces, is automatically activated to conduct the magnetic flux generated by a given one of the pole units towards the gripping surface, so as to generate a pole, or "false pole", having a polarity opposite to that of said given pole unit, whenever the dimensions and/or disposition of the workpieces to be gripped are such as to prevent short-circuiting or contact with two adjacent pole units of opposing polarity. Otherwise, said intermediate pole member operates as a wholly neutral element which is magnetically inactive towards the workpiece anchoring or gripping surface and contributes merely to support the workpieces to be gripped. This dual function of the intermediate pole member, which in fact causes a variation in the pole pitch, occurs wholly automatically in relation to the different lengths or dimensions of the metal workpieces to be gripped.

These and further features of the apparatus according to this invention will ensue from the following description of some embodiments, with reference to the accompanying drawings, in which.

DESCRIPTION OF THE INVENTION

Figure 1:
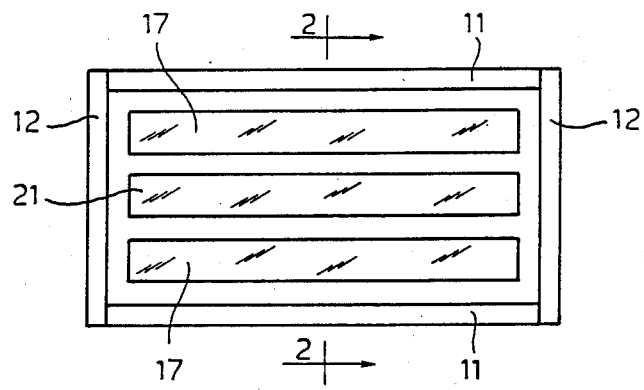
FIG. 1 shows a top view of a first embodiment of a flux reversal type apparatus of this invention.

FIG. 1 shows a first apparatus of the type having longitudinally arranged poles which can be activated and deactivated by reversing the magnetic flux of magnets in the magnetic circuit, as described for example in U.S. Pat. No. 4,356,467. The apparatus comprises an external ferromagnetic yoke, made of low-carbon steel, consisting of a base plate 10, having a flat surface 10'a, lateral walls 11, parallelly arranged to the longitudinal axis of the apparatus, and end walls 12. Said apparatus comprises two pole units 13 and 14 designed to generate poles of opposite polarity on the outer surface 15 for magnetically gripping metal workpieces 16; the apparatus could, however, comprise more than two pole units, designed to generate subsequent poles which are alternately of opposite polarity.

Each pole unit 13, 14 is composed of a ferromagnetic element 17, also referred to as main pole piece, in the form of a low-carbon steel bar which extends in the direction of the longitudinal axis of the surface 15; each pole piece 17 comprises an upper or outer surface 13a, 14a defining the surface 15 for gripping the workpieces 16, and a lower face 13b, 14b parallel to the main face 10'a of the base plate 10. Each pole unit 13 and 14 also comprises a main magnet core 18, consisting of magnetically reversible permanent magnets, having its magnetic axis aligned with the respective axis of the pole piece 17, said magnet core 18 being disposed or arranged between and in contact with the base plate 10 and the pole piece 17 above it; the magnet core 18 is surrounded by an electric coil 19 through which are sent current pulses provided by a multiple capacitive discharge electric power supply unit, which is per sé known and not forming part of this invention, in order to generate a magnetic field suitable for reversing the magnetic flux needed to activate and deactivate the apparatus, by reversing from time to time the polarization of the magnet cores 18 which co-operate with secondary magnets, described further on, to activate and, respectively, deactivate magnetic poles of suitable polarity on the workpiece gripping surface 15 of the apparatus.

Figure 2:
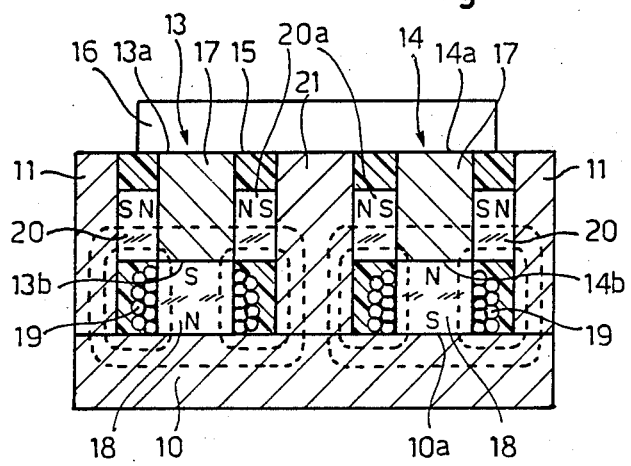
FIG. 2 shows a cross-sectional view along the line 2—2 of FIG. 1, with the apparatus in the deactivated condition gripping a workpiece of sufficient length to shortcircuit two pole units of opposite polarity.

In the case of FIGS. 1 and 2, since the apparatus is of the type which can be activated and deactivated by reversing the flux of the magnet cores 18, each pole unit 13, 14 further comprises secondary magnet cores 20, 20a, which peripherally surround at least two lateral faces of each main pole piece 17, having their magnetizing axis directed at right angles to the magnetic axis of the reversible core 18, and parallel to the gripping surface 15. The secondary magnets 20 of each pole unit are all facing in the same way with respect to the pole piece 17, that is, they are in contact with the latter by a pole of the same polarity, so that in the activated condition of the apparatus of the pole units, for example, pole unit 13, generates on the gripping or anchoring surface 15 a pole having a polarity opposite to that of the pole generated by the other pole unit 14.

Compared to the previously known apparatus, the magnetic apparatus of FIGS. 1 and 2 is characterized by the presence of an intermediate pole member 21, made of ferromagnetic material, interposed between each pole unit of a first polarity, and an adjacent pole unit having a polarity opposite that of the first one.

Figure 3:
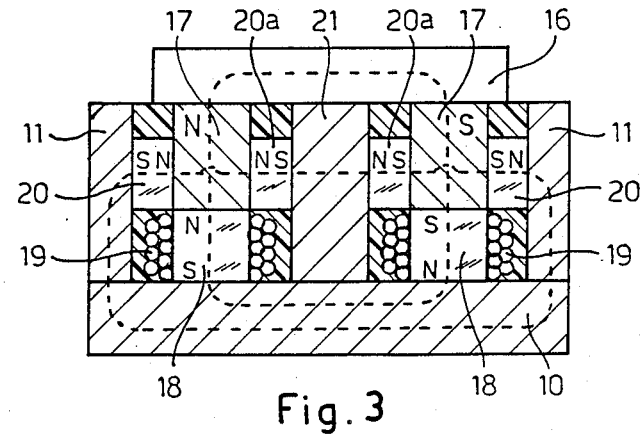
FIG. 3 shows a cross-sectional view similar to that of FIG. 2, with the apparatus in the activated condition.
Figure 4:
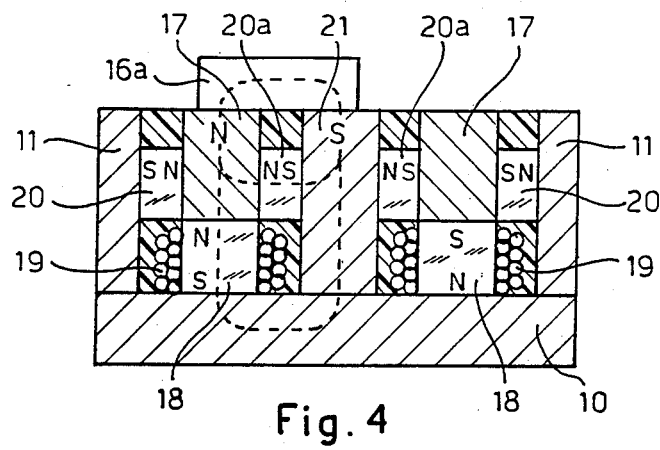
FIG. 4 shows a cross-sectional view similar to that of FIG. 3, with the apparatus in the activated condition, for securing a workpiece shorter in length between a pole unit and the intermediate pole member.

The intermediate pole member 21 is therefore in contact with poles of opposite polarity of the magnet cores 20a and extends from the base plate 10 to the anchoring surface 15. In particular, the intermediate pole member 21 can either be placed directly in contact with the base plate 10, or by means of a spacer (not shown) made of non-magnetic material, such as brass or other material, which must be of a relatively limited thickness and must not exceed approximately 10% of the magnetic length of the reversible magnet 18, measured in the direction of their magnetizing axis. FIGS. 2, 3 and 4 of the accompanying drawings, in which the paths of the magnetic flux are illustrated schematically by dotted lines, point out the fundamental functions of the intermediate pole member 21. In fact, in FIG. 2 which represents the deactivated condition of the apparatus, in which the flux lines close through an inner circuit which leaves the anchoring surface 15 completely neutral, the pole member 21 serves exclusively as a magnetic conductor for completing the inner circuits, and for supporting the workpiece 16.

Conversely, in the activated condition of the apparatus of FIG. 3, in which the workpiece 16 to be anchored is of such length or dimensions as to come into contact with the opposite poles N and S of both pole units 13 and 14, even though it is positioned straddling the intermediate pole member 21, the latter remains completely neutral on the outer face defining the anchoring surface 15 and serves merely as a short-circuiting element between the secondary magnet cores 20a of adjacent pole units, so that the apparatus functions with a first pole distance or pole pitch, that is to say, corresponding to the actual distance between the magnetic axes of the two pole units 13 and 14, as schematically shown.

Conversely, in the case represented in FIG. 4, in which the workpiece 16a to be anchored is smaller in length or dimensions than the previous workpiece 16, so that it is in contact with just one of the pole units 13 or 14 and the intermediate pole member 21, the latter carries out a new function of magnetic conductor towards the anchoring surface 15 for the flux of the magnet cores just of pole unit 13 with which the workpiece 16a is in direct contact, thereby providing an auxiliary pole, or "false pole" of opposite polarity to the activated one. Thus the pole member 21 practically halves the pole pitch with respect to the previous case of FIG. 3. Since the other pole unit 14 in FIG. 3 remains with its magnetic circuit open towards the anchoring surface 15, it does not take part in anchoring the workpiece 16a.

The advantages and features of the apparatus according to the FIGS. 1 to 4 of this invention, with respect to the apparatus of U.S. Pat. No. 4,356,467 become clearly evident by means of a simple comparison; in fact, in the previous apparatus, the pole pitch, in particular the gap or distance between the opposing surfaces of two adjacent pole pieces, is determined by the magnetic length of the non-reversible magnet core. Very often this distance cannot be reduced due to the fact that the non-reversible core must resist the electrically generated magnetic field for reversing the other magnet cores, of both poles, without suffering damage. As a result, the gap between the adjacent pole units proves excessive for all those uses in which the dimensions of the workpieces to be anchored are smaller than the aforesaid distances.

On the contrary, according to this invention, by providing a supplementary pole member between two adjacent pole units, it is possible to reduce the length of the magnets 20a by half with respect to the apparatus of the previous application, and to obtain moreover an apparatus capable of automatically modifying its pole pitch, by increasing or decreasing it according to the dimensions of the workpieces to be anchored. Unlike the various pole units 13, 14, which are fed directly with magnet cores 20 and 20a having poles of the same polarity in contact with the respective main pole piece 17, it should be pointed out that in the case of the intermediate pole members 21, the cores 20a which are arranged on the two opposing surfaces of each element 21, are in contact with poles having opposite polarities, or so as to always face in the same direction, and to have the same direction of magnetization.

With the apparatus described here, it is possible to obtain a workpiece gripping surface which, with the same magnetomotive force, is capable of providing a normal or halved pole pitch, thanks to the dual function of the intermediate pole member 21 which, in the case of anchoring large-sized workpieced capable of short-circuiting pole units of opposite polarities, does not take part in anchoring the workpiece, but is limited exclusively to performing the function of a magnetic link between the magnet cores 20a; in this case, the apparatus maintains a high anchoring power and magnetic field depth in the workpiece to the gripped. Conversely, in the case of gripping small-sized workpieces, the intermediate pole member 21 serves to short-circuit the magnetic flux generated just by the pole unit 13, or 14, towards the workpiece 16a thus providing on the anchoring surface a pole of opposite polarity which automatically disappears when the apparatus is deactivated. In this second situation, the anchoring power for each pole remains unchanged even though the magnetomotive force or field depth are, in this second case, halved.

Figure 5:
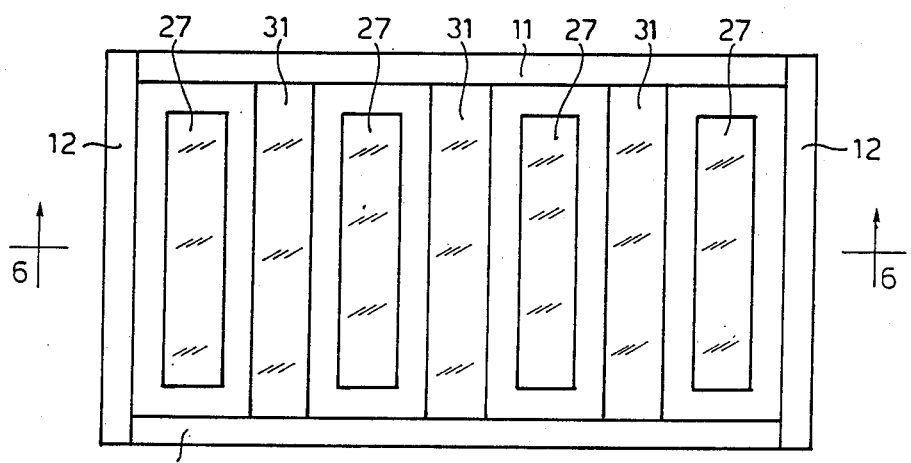
FIG. 5 shows a top view of a second apparatus according to this invention, of the type deactivatable by complete demagnetization.
Figure 6:
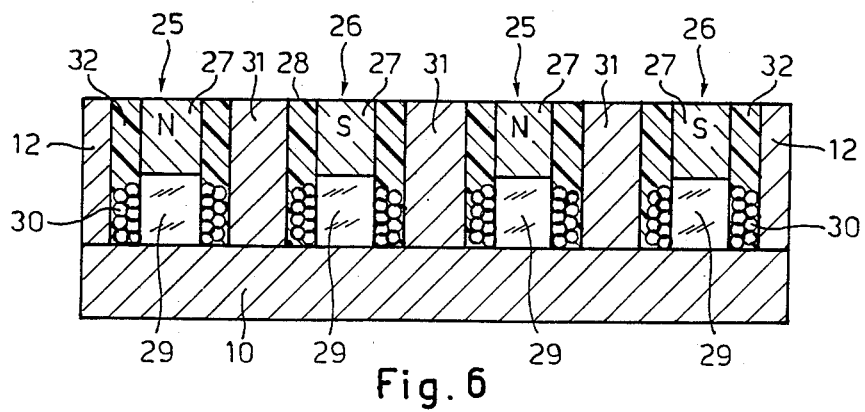
FIG. 6 shows a longitudinal cross-sectional view along the line 6—6 of FIG. 5, in the deactivated condition of the apparatus.

A second embodiment of a magnetic gripping apparatus incorporating the improvements of this invention is shown in FIGS. 5 and 6, relating to a permanent-magnet apparatus which is deactivated by complete demagnetization. Also in the case shown in FIGS. 5 and 6, the apparatus comprises a base plate 10 and peripheral walls 11 and 12 together defining a ferromagnetic yoke inside which are disposed pole units 25 having a first polarity N which alternate with pole units 26 having a polarity S opposing the first one. Each pole unit 25 and 26 is substantially composed of a ferromagnetic element or main pole piece 27, one face of which ends in correspondence with the anchoring or gripping surface 28, and of a core of magnetic material 29 surrounded by an electrical coil 30, both of which are disposed coaxially to the magnet core 28 which is in contact between the upper ferromagnetic element 27 and the base plate 10. As described for example in the English Pat. No. 758183, electric current is pulsed through the coil 30, in one direction or in the opposite direction, so as to generate magnetic fields of short length but of sufficient intensity to magnetize the cores 29 when the apparatus must be activated, or to completely demagnetize the cores when the apparatus must be deactivated by carrying out a suitable decreasing sequence of demagnetizing cycles. Unlike the aforementioned English patent, and according to this invention, a supplementary or intermediate pole member 31 having functions and features identical to the intermediate pole member 21 of the previous figures, has been disposed between the adjacent pole units 25, 26 or opposing polarity, and extends from the base plate 10 to the anchoring surface 28 of the apparatus described herein. In both cases, epoxy resin 32 fills the gaps remaining between the pole units and the magnetic conductors or intermediate pole members.

The flux density which can be obtained with the apparatus of FIGS. 5 and 6 is lower than that which can be obtained with the apparatus of FIGS. from 1 to 4, and the anchoring power per unit of surface is therefore also lower; there are however a number of important uses, for example in the magnetic plates of grinding machines, for which it is not as important to have high anchoring powers per unit of surface as it is to have a dense polarity with the poles placed very close together; this is possible with the apparatus of FIGS. 5 and 6 due to the possibility of obtaining a very limited pole pitch thanks to the absence of secondary magnet cores between the pole units and the corresponding supplementary pole pieces. This apparatus however still has the capacity to also secure semi-finished or average-sized workpieces, for which a satisfactory field depth is essential, due to the above-mentioned possibility of automatically varying the pole pitch by increasing it automatically in relation to the workpieces to be anchored. Here too, the variation in the pole pitch is not achieved by modifications in the magnetic circuit, but is caused by the presence and disposition of different-sized workpieces to be anchored.

In the case of FIG. 1, the pole units and the intermediate pole members are parallel to the longitudinal axis of the apparatus, whereas in the case of FIG. 5 they are parallel to the transversal axis; it is obvious however that in both cases the dispositions could also be reversed or varied according to need, and the surfaces could also be provided with shapes other than rectangular.

Moreover, the intermediate pole members may be of the same length as the pole units, remaining spaced apart from the outer walls of the yoke (FIG. 1) or may be greater in length, coming into contact with the aforesaid walls (FIG. 5).

In FIG. 6, the intermediate pole members 31 are delimited on the sides by flat surfaces, in parallel pairs, so that each pole member 31 has a constant width over its entire length; moreover, the coil 30 is shown as made up of at least two layers of coaxial turns. The minimum width of the gaps is therefore substantially conditioned by the dimensions of the coils which surround the intermediate pole members.

Figure 7:
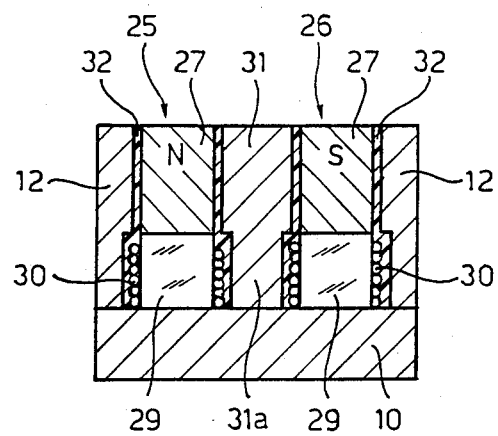
FIG. 7 shows a cross-sectional view of an apparatus operating in a similar mode to that of FIGS. 5 and 6 but provided with only two pole units and a modified intermediate pole member.

FIG. 7 of the drawings illustrates a cross-section similar to that of FIG. 6 for a modified embodiment of the apparatus of the demagnetizable type, which is particularly suitable in cases in which it is necessary to further reduce the gaps; since in the case of FIG. 6 the widths of the gaps are practically determined by the overall dimensions of the coils 30 for magnetizing and demagnetizing the magnet cores, according to the example of FIG. 7, it is possible to further reduce the gaps by making the coils in a single layer, providing seats to house the coils by tapering or reducing the width of the lower portion of the pole members 31, as shown by 31a in FIG. 7. It will be clear therefore, from what has been described and shown, that the invention refers to a magnetic apparatus for anchoring metal workpieces, as defined, which is characterized by magnetically neutral gaps of limited width, which in a number of cases can also be smaller than approximately 4 mm, and maintains the possibility of automatically varying the pole pitch, passing from a wide pole pitch provided with a high field depth in the presence of large-sized workpieces capable of short-circuiting at least two pole units of opposite polarity, to a narrow pole pitch with a low field depth in the presence of small-sized workpieces. The apparatus also has an exceptional mechanical strength since all the components can be made integral with the base plate, and is extremely easy to construct due to the absence of pole-plates or other parts defining the workpiece anchoring surface. It is understood however that what has been described and shown in the accompanying drawings was given purely by way of example in order to illustrate the innovative features of this invention, which can also be applied to other magnetic circuits, as shown for example in FIG. 8. The apparatus of FIG. 8 can either be of the flux reversal type; such as the one in FIG. 1, or of the demagnetizable type, such as the one in FIG. 5; the apparatus of FIG. 8 due to a different disposition of the pole units 35, and of the intermediate pole members 36.

Figure 8:
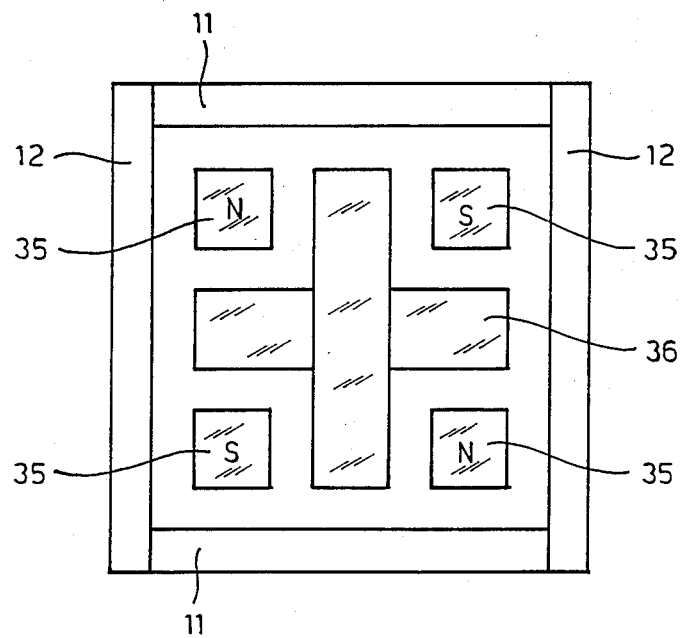
FIG. 8 shows a top view of a fourth embodiment according to the invention, showing a four pole pattern disposition, which can either be of the flux reversal type, according to FIGS. 1 and 2, or of the demagnetization type according to FIGS. 5 and 6.

In particular, the apparatus of FIG. 8 also comprises a base plate, at least one set of four pole units 35 defining, in the activated condition of the apparatus, pairs of poles having a first polarity N and, respectively, a second polarity S, opposite to the first, on the anchoring surface of the apparatus, arranged at the corners of a square disposition. Each pole unit 35 can be similar to the pole units 13, 14 of FIG. 2 or to the pole units 25, 26 of FIG. 6, each comprising therefore a main pole member one side of which forms part of the anchoring surface, and at least one magnet core surrounded by a coil, whose core is axially aligned with the main pole member since it is interposed between the latter and the base plate, as shown in the figures of the previous apparatus to which the reader is referred. The pole units 35 have their magnetic axis at right angles to the base plate in correspondence with the corners of a square, and the intermediate pole members 36, which in this specific case are arranged in the form of a cross, are interposed between the pole units, in correspondence with medial broadside planes between the pole units 35. The disposition of the pole units and the intermediate pole members between the aforesaid pole units must obviously be repeated identically several times as desired in order to obtain apparatus having anchoring surfaces of the desired dimensions.

What is claimed is:

1. Magnetic gripping apparatus comprising an external ferromagnetic yoke having a base plate and peripheral walls; at least a first and a second pole unit each pole unit comprising a main pole piece having an outer face defining a gripping surface; an intermediate pole member positioned between said first and second pole units, said intermediate pole member having an outer face and said intermediate pole member extending from the base plate to said gripping surface; permanent magnets arranged at least between the main pole pieces and the base plate; an activating and deactivating electrical winding encircling said permanent magnets arranged between the main pole pieces and the base plate, and said intermediate pole member being formed of a material adapted to conduct magnetic flux and said intermediate pole member being positioned between said first and second main pole units such that, when said permanent magnets are activated and a workpiece to be gripped is positioned so as to come in contact with the intermediate pole member and only one of said first and second main pole units, said intermediate pole member forms a false pole which, on the gripping surface, is of a polarity opposite that of the gripping surface of the main pole piece in contact with the workpiece; and said intermediate pole member also positioned such that, when said permanent magnets are activated and a workpiece to be gripped is positioned so as to come in contact with both said first and second main pole units, said intermediate pole member has a neutral gripping surface.

2. Apparatus as claimed in claim 1, wherein said intermediate pole member includes an upper portion having a first width, and a lower portion having a smaller width which defines a recess in said apparatus adapted to contain the coils of said electrical windings.

3. Apparatus as claimed in claim 1, wherein there exists gaps between said pole units and said intermediate pole member which are smaller than 4 mm.

4. Magnetic gripping apparatus for gripping metal workpieces as claimed in claim 1, comprising in combination: a base plate and lateral walls, at least a first and a second pole unit, each having a main pole piece one face of which defines a workpiece anchoring surface; a reversible permanent magnet disposed between the main pole piece and the base plate, the reversible magnet of each pole unit surrounded by an electrical coil for reversing the magnetic field; non-reversible magnets co-operating with at least two opposite sides of each main pole piece, said nonreversible magnets being permanently magnetized so as to have a pole face of the same polarity in contact with the respective face of the main pole pieces; the apparatus moreover comprising a supplementary pole member interposed between adjacent pole units of opposite polarity, said supplementary pole member extending from the base plate to the anchoring surface and being in contact with the pole faces of the non-reversible magnets having opposite polarity.

5. Magnetic gripping apparatus for metal workpieces as claimed in claim 1, comprising in combination: a base plate and lateral walls; at least a first and a second pole unit with each pole unit having a main pole piece, one face of which defines a workpiece gripping surface; electric coils; a magnet disposed between each main pole piece and the base plate, the magnets of the pole units each being surrounded by a respective one of said electric coils so as to provide means for magnetizing said magnets of alternate ones of said units with opposite polarity, and a supplementary pole member interposed between adjacent pole units of opposite polarity, said supplementary pole member extending from the base plate to the magnetic gripping surface.

6. Magnetic gripping apparatus for metal workpieces, as claimed in claim 1, comprising in combination: a base plate and lateral walls; at least one pattern of four pole units defining a gripping surface, said pole units each having a magnetic axis positioned perpendicular to the base plate and in correspondence with the vertices of a given square; each pole unit comprising a main pole piece and at least one magnet interposed between the main pole piece and said base plate, an electrical coil surrounding a respective one of each of said magnets; and said intermediate pole member interposed between adjacent pole units of opposite polarity, said intermediate pole member extending from the base plate to the anchoring surface of the apparatus.

7. Apparatus as claimed in claim 6, in which the intermediate pole member is in the form of a cross-shaped member having portions parallelly arranged to intermediate planes between said pole units.

8. A magnetic gripping apparatus, comprising:
 (a) an external ferromagnetic yoke having a base plate and peripheral walls;
 (b) a set of main pole pieces with each main pole piece having an outer surface defining a gripping surface and an inner surface;
 (c) a set of permanent magnets, each one of which is positioned between, and in contact with, said base plate and the inner surface of a respective one of said main pole pieces;
 (d) a set of electric windings, each one surrounding a respective one of said permanent magnets;
 (e) an intermediate pole member having a first end in contact with said base plate and a second end defining an upper surface in common with said gripping surface, and said intermediate pole member being disposed between said main pole pieces;
 (f) first and second secondary magnets, said first secondary magnet positioned between said intermediate pole member and a first main pole piece, said second secondary magnet positioned between said intermediate pole member and a second main pole piece, and said first and second secondary magnets having opposite polarities facing said intermediate pole member positioned therebetween;
 (g) third and fourth secondary magnets, said third secondary magnet positioned between said first main pole piece and said external ferromagnetic yoke, said fourth secondary magnet positioned between said second pole piece and said external ferromagnetic yoke, said third and fourth secondary magnets having a pole arrangement which results in said third secondary magnet having a polarity in contact with said external ferromagnetic yoke which is opposite that of said fourth secondary magnet.

9. A magnetic apparatus for gripping variable sized workpieces, comprising:
 (a) an external ferromagnetic yoke having a base plate and peripheral walls;
 (b) first and second main pole pieces with each main pole piece having an outer surface defining a gripping surface and an inner surface;
 (c) a pair of permanent magnets, one each of which is positioned between, and in contact with, said base plate and the inner surface of one of said main pieces, said permanent magnets arranged such that, when said permanent magnets are in an activated state, the outer surfaces of said first and second main pole pieces are opposite in polarity;
 (d) a pair of electric windings, each one surrounding a respective one of said permanent magnets;
 (e) intermediate pole means disposed between said first and second main pole pieces and extending from said base plate to the gripping surface, said intermediate pole means being formed of a material adapted to conduct magnetic flux and said intermediate pole means positioned between said first and second main pole pieces such that, when a workpiece to be gripped is positioned so as to come in contact with said intermediate member and only one of said first and second main pole pieces and said pair of permanent magnets is activated, said intermediate pole means forms a false pole which, on the gripping surface, is of a polarity opposite that of the gripping surface of the pole piece which is in contact with the workpiece; and
 said intermediate pole means also positioned such that when a workpiece to be gripped is positioned so as to come in contact with both said first and second main pole pieces and said pair of permanent magnets is activated, said intermediate pole means has a neutral gripping surface.

* * * * *